United States Patent
Heng et al.

(10) Patent No.: US 9,279,726 B2
(45) Date of Patent: Mar. 8, 2016

(54) OPTICAL DEVICE WITH REDUCED CROSSTALK

(71) Applicant: Avago Technologies General IP (Singapore) Pte. Ltd.

(72) Inventors: Cherng Woei Heng, Sembilan (MY); Kai Koon Lee, Singapore (SG); Wee Sin Tan, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 284 days.

(21) Appl. No.: 13/960,620

(22) Filed: Aug. 6, 2013

(65) Prior Publication Data

US 2015/0041630 A1 Feb. 12, 2015

(51) Int. Cl.

| | |
|---|---|
| *G01S 17/08* | (2006.01) |
| *G01J 3/50* | (2006.01) |
| *G01S 17/02* | (2006.01) |
| *G01S 7/481* | (2006.01) |
| *G06F 3/03* | (2006.01) |
| *H04B 10/00* | (2013.01) |

(52) U.S. Cl.
CPC .............. *G01J 3/50* (2013.01); *G01S 7/4813* (2013.01); *G01S 7/4815* (2013.01); *G01S 17/026* (2013.01); *G06F 3/0304* (2013.01)

(58) Field of Classification Search
CPC ... G06F 3/0304; G06F 3/0308; G06F 3/0325; G06F 3/033; G06F 3/03543; G06F 3/03544; G01S 7/481; G01S 7/4813; G01S 7/4814; G01S 7/4815; G01S 17/02; G01S 17/026
See application file for complete search history.

(56) References Cited

U.S. PATENT DOCUMENTS

| | | | |
|---|---|---|---|
| 2012/0037793 A1* | 2/2012 | Ong et al. | 250/216 |
| 2014/0231635 A1* | 8/2014 | Kerness et al. | 250/226 |

FOREIGN PATENT DOCUMENTS

WO WO-2012168333 12/2012

OTHER PUBLICATIONS

Schmitz, Tamara , "Know Your Tradeoffs Before Placing Your Sensors", Electronic Design. Downloaded from Internet <electronicdesign.com/components/know-your-tradeoffs-placing-your-sensors> Feb. 1, 2013 pp. 1-5.

* cited by examiner

*Primary Examiner* — Daniel Dobson

(57) ABSTRACT

In one embodiment, an optical device comprising an emitter, first and second emitter optical elements and a receiver is disclosed. The emitter and the receiver may be arranged substantially along a longitudinal axis. The first and second emitter optical elements may be interposing the longitudinal axis. One other embodiment discloses an optical device comprising an emitter and a receiver arranged on a longitudinal axis. The optical device may further comprise first and second emitter optical elements arranged along an axis orthogonal to the longitudinal axis but interposing the longitudinal axis. In another embodiment, a proximity sensor having first and second emitters interposing a longitudinal axis is disclosed.

20 Claims, 18 Drawing Sheets

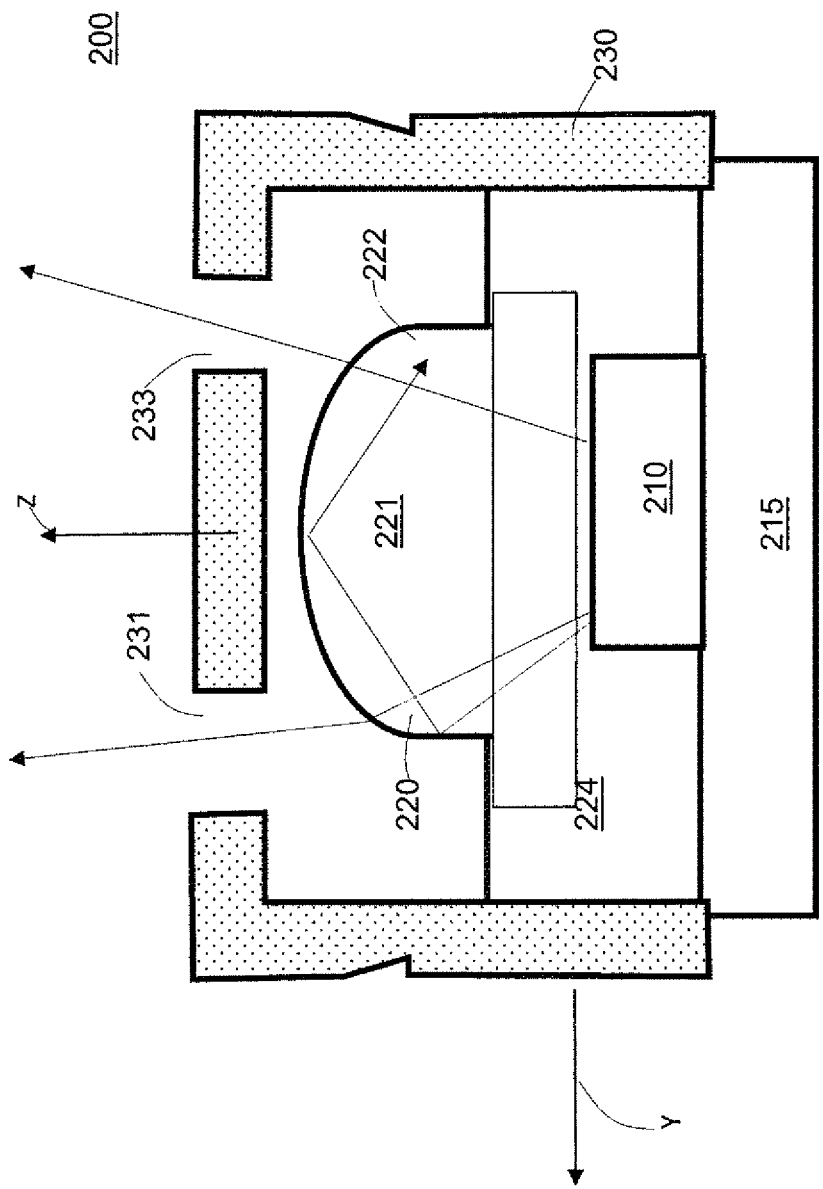

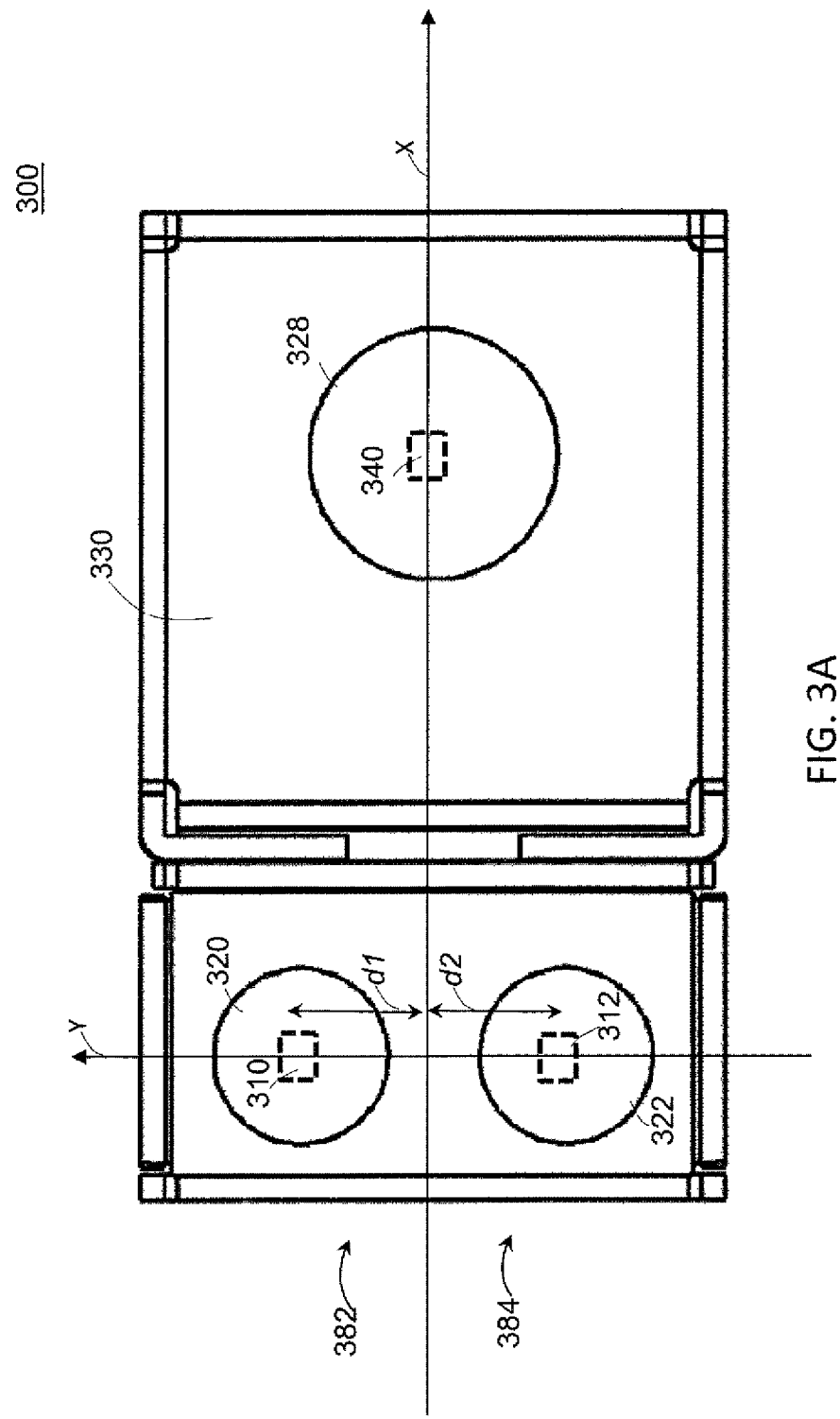

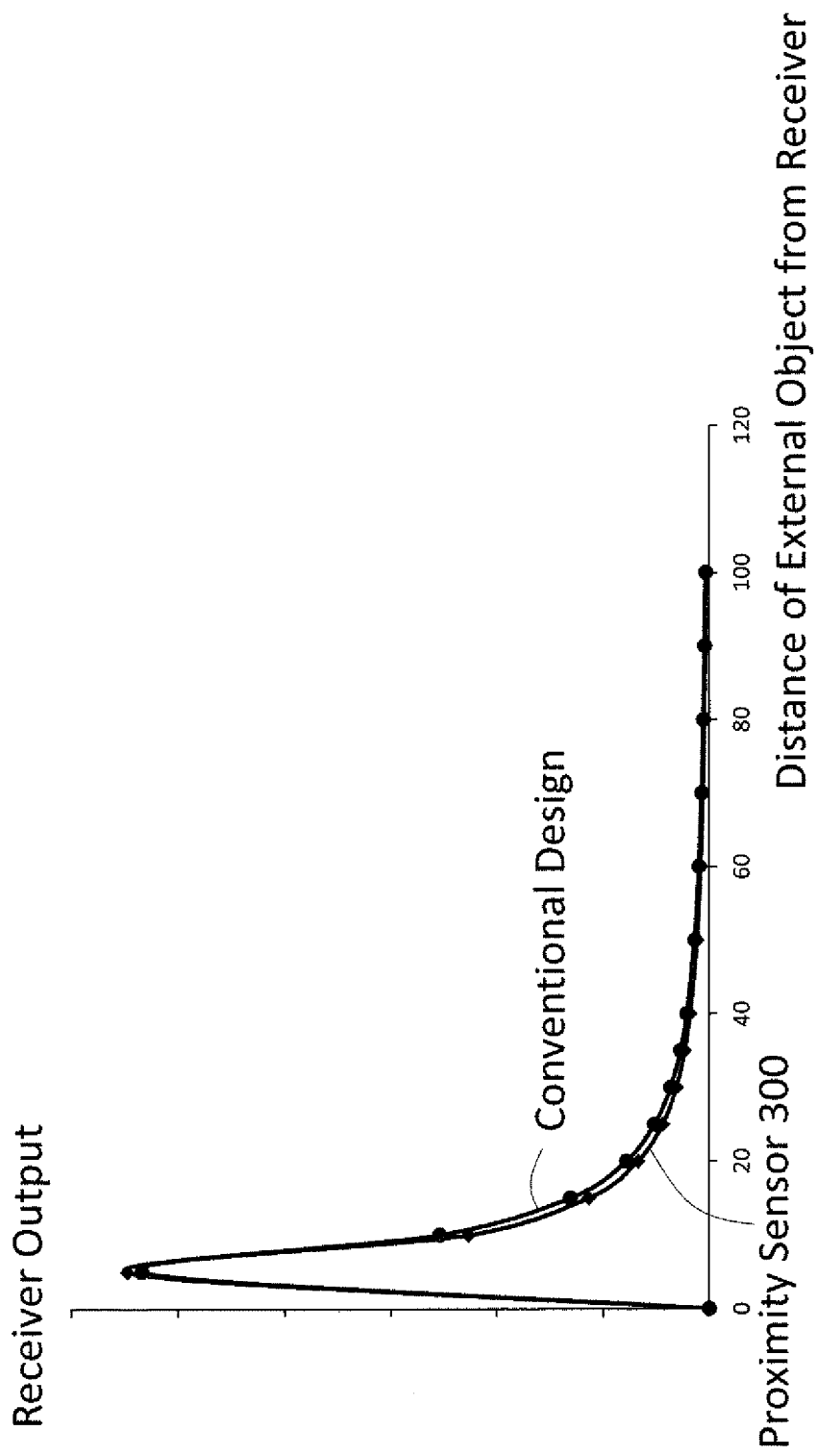

OPTICAL DEVICE WITH REDUCED CROSSTALK

BACKGROUND

Optical devices are widely used nowadays. Examples of optical devices are proximity sensors, color sensors, optical encoders or any other similar sensors that comprise an emitter and a receiver for emitting and detecting a radiation. The radiation may be visible or invisible. On some occasions, an optical lens may be coupled to the emitter in order to collimate the radiation to specific directions or distances of interest so that the radiation can be fully utilized for high power efficiency. Similarly, an optical lens may be coupled to the receiver to collimate radiation from a specific direction to the receiver.

For most optical devices that have an emitter and a receiver, the radiation emitted from the emitter is usually directed to an external object or an external medium before being received by the receiver. For optical devices having transmissive arrangement such as transmissive optical encoder, the radiation emitted by the emitter may be transmitted through the external object before being detected by the receiver. For optical devices having reflective arrangement such as proximity sensors and reflective optical encoders, the external object may reflect or redirect a portion of the radiation emitted from the emitter into the receiver.

In response to the radiation detected, the receiver may generate a signal indicative of at least one property of the external object. For example, for proximity sensors, the signal generated by the receiver is indicative of presence of the external object. For color sensors, the signal generated may be indicative of the color of the external object.

However, a portion of the radiation may be detected by the receiver without going through or without being reflected by the external object. The radiation detected by the receiver without being redirected by the external object may be known as crosstalk. Crosstalk is independent from the external object and may reduce the signal to noise ratio of the optical device. Crosstalk may occur within the optical package, or via external structures. For example, most optical devices are to be assembled into an electronic apparatus having a casing. Most casings are transparent but crosstalk may occur due to total internal reflection in which a portion of the radiation emitted by the emitter is reflected into the receiver without going through the external object.

Proximity sensors are sensor devices configured to detect presence of nearby objects without any physical contact. Proximity sensors are commonly used in electronic gears that will turn power-consuming circuitry on or off in response to the proximity sensors detecting something nearby. Use of proximity sensors in such applications may be particularly efficient because they may provide for detecting proximity without having to make physical contact. Proximity sensors may be used in mobile phone, digital photo frames, television, or other electronic devices.

BRIEF DESCRIPTION OF THE DRAWINGS

Illustrative embodiments by way of examples, not by way of limitation, are illustrated in the drawings. The drawings may not be drawn per actual scale. Throughout the description and drawings, similar reference numbers may be used to identify similar elements.

FIG. 2F illustrates a cross-sectional view of the optical device along line 4-4 shown in FIG. 2A;

FIG. 3A illustrates a top view of a proximity sensor;

FIG. 4A illustrates a graph showing receiver output plotted against distance of an external object when the external object is moved away from the receiver;

DETAILED DESCRIPTION

Figure 1A:
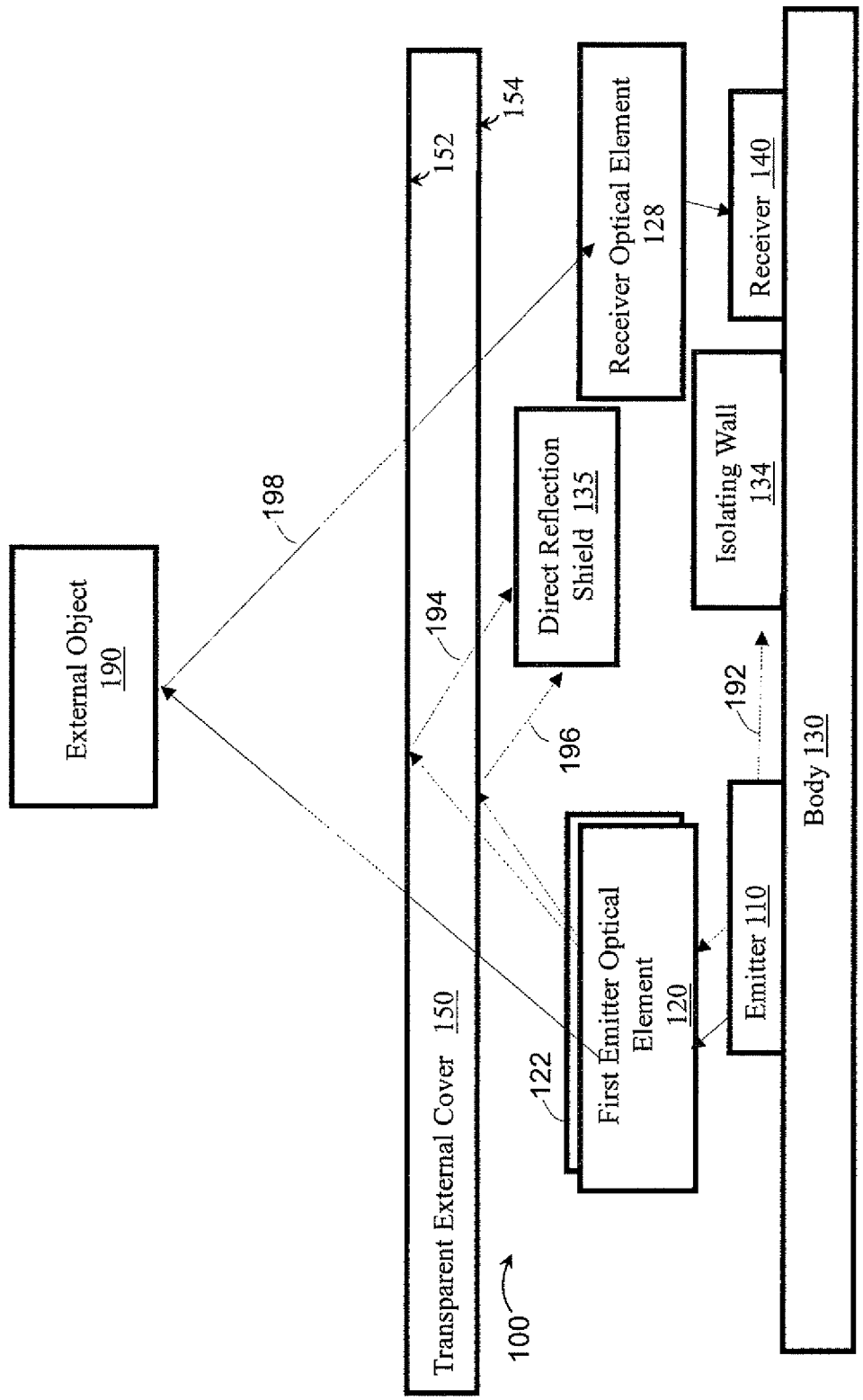
FIGS. 1A-1C show various illustrations of a block diagram of an optical device in an arrangement to reduce crosstalk.
Figure 1B:
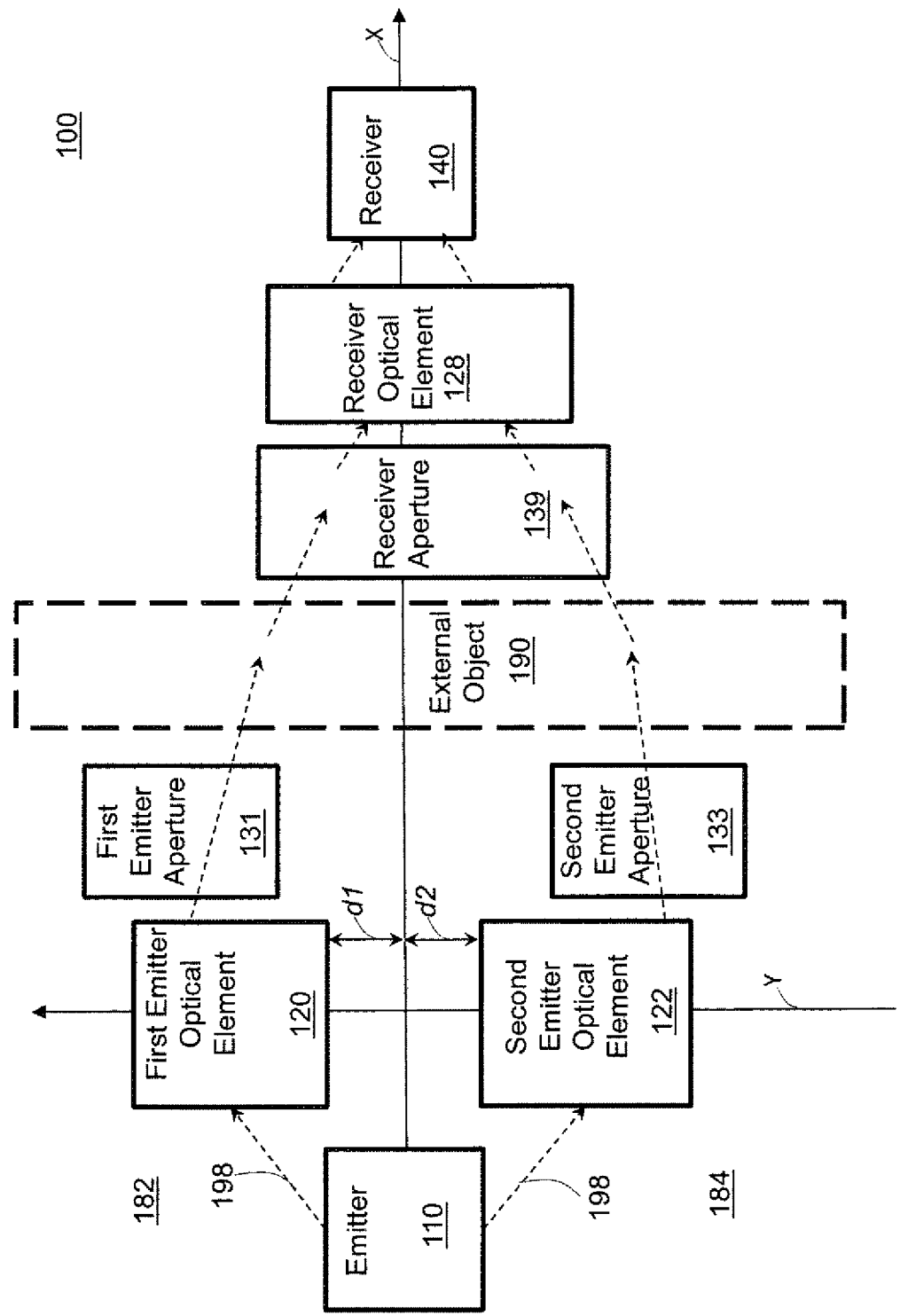
Figure 1C:
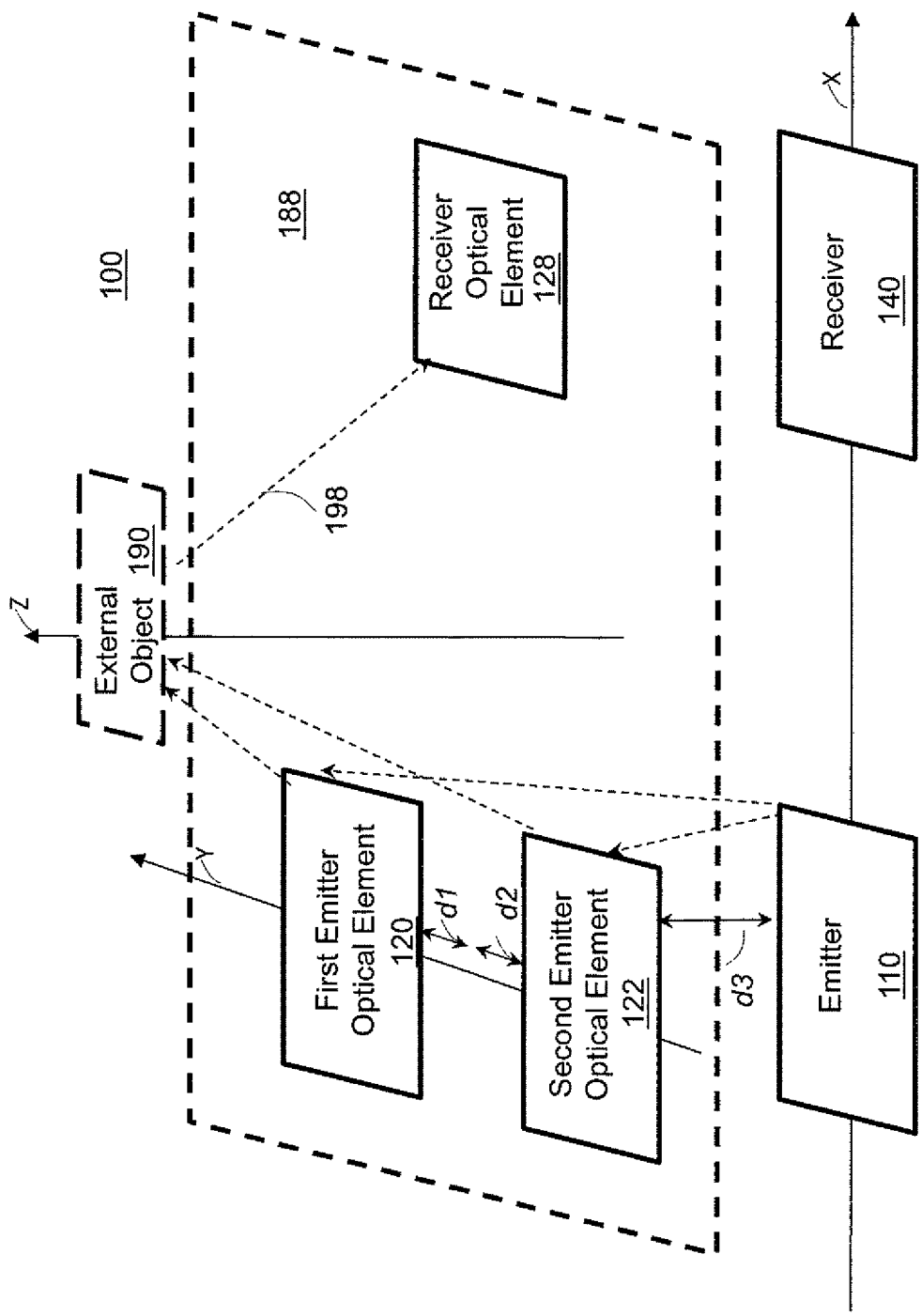

FIGS. 1A-1C shows various illustrations of a block diagram of an optical device 100. The optical device 100 may comprise an emitter 110, first and second emitter optical elements 120, 122, a receiver optical element 128, and a receiver 140. The optical device 100 may optionally comprise a body 130. The emitter 110 may be configured to emit a radiation 198. The radiation 198 may be directed by the first and second emitter optical elements 120, 122 towards, and to be reflected off of, an external object 190. A portion of the radiation 198 reflected back towards the optical device 100 may be directed by the receiver optical element 128 to the receiver 140.

The emitter 110 may be a light source or a radiation source configured to emit a radiation 198. The radiation may be visible light or invisible light such as an ultra violet or infrared. The term "light" or "radiation" may be narrowly interpreted as only a specific type of electro-magnetic wave but in this specification, all variations of electro-magnetic wave should be taken into consideration when a specific type of light or radiation is discussed unless explicitly expressed otherwise. For example, ultra-violet, infrared and other invisible radiation should be included when considering the term "light" or "radiation" although literally light means radiation that is visible to human eyes. In one embodiment, the emitter 110 may be a light-emitting diode (referred hereinafter as LED).

The receiver optical element 128, the first and second emitter optical elements 120, 122 may be configured to collimate or to redirect the radiation 198 towards a specific direction rather than being scattered in multiple directions to increase power efficiency. In one embodiment, the receiver optical element 128, the first and second emitter optical elements 120, 122 may be optical lenses attached to the optical device 100. In yet another embodiment, the receiver optical element 128, the first and second emitter optical elements 120, 122 may be a substantially transparent encapsulant formed in a lens shape to direct light. The receiver optical element 128, the first and second emitter optical elements 120, 122 may be made from glass, epoxy or silicone.

The receiver 140 may be a photo-detector configured to convert the radiation 198 into a signal. The receiver 140 may be a photo-diode, a phototransistor or an array of photo-detectors such as a camera chip. The receiver 140 may comprise amplifier circuits embedded within a single semiconductor die. The emitter 110 and the receiver 140 may be arranged on a substrate (not shown) or a body 130 facing the external object 190 as shown in FIG. 1A.

The body 130 may be a portion of an optical package housing the emitter 110 and the receiver 140. The body 130 may comprise an isolating wall 134 configured to shield the receiver 140 from receiving the radiation 192 directly from the emitter 110 so that the radiation 198 detected by the receiver 140 may be substantially directed or reflected from the external object 190. The optical device 100 may form a portion of an optical apparatus (not shown) having a substantially transparent cover 150. The optical device 100 may be arranged approximating the substantially transparent cover 150 causing crosstalk.

Specifically, the substantially transparent cover 150 may have a flat surface 154 and an internal surface 152 facing the optical device 100. The flat surface 154 may reflect a portion of radiation 196 back towards the receiver 140. Similarly, the internal surface 152 may also reflect a portion of radiation 194 back towards the receiver 140 through total internal reflection. The radiation 194 and 196 reflected may be crosstalk that may be independent from the external object 190 causing noise to the optical device 100. The optical device 100 may further comprise a direct reflection shield 135 to block the reflected radiation 194, 196 from the substantially transparent cover 150 by way of total internal reflection preventing crosstalk. In addition, the substantially transparent cover 150, the emitter 110, the receiver 140, the first and second emitter optical elements 120, 122 may be arranged such that the radiation 194, 196 reflected by the substantially transparent cover 150 falls outside of the receiver optical element 128 to substantially avoid and/or substantially prevent crosstalk.

Referring to FIG. 1B, the emitter 110, the first and second emitter optical elements 120, 122, the receiver optical element 128 and the receiver 140 may be arranged in an arrangement to reduce crosstalk. As shown in FIG. 1B, the emitter 110 and the receiver 140 may be arranged substantially along a longitudinal axis X. The longitudinal axis X may extend in parallel to the body 130 (See FIG. 1A). The optical device 100 may be configured to detect the external object 190 that may be present above the optical device 100.

The longitudinal axis X may be interposed between the first and second emitter optical elements 120, 122. The longitudinal axis X may divide the first and second emitter optical elements 120, 122 from one another. As shown in FIG. 1B, the longitudinal axis X may divide the optical device 100 into a first lateral region 182 and a second lateral region 184 from one another. The first emitter optical element 120 may be disposed at the first lateral region 182 of the optical device 100, whereas the second emitter optical element 122 may be disposed at the second lateral region 184.

By having the first and second emitter optical elements 120, 122 being distanced away and interposing the longitudinal axis X, while having the emitter 110 disposed substantially along the longitudinal axis X as shown in FIG. 1B, the radiation 198 emitted from the emitter 110 may not be transmitted substantially in parallel to the longitudinal axis X. For example, the radiation 198 from the emitter 110 may be directed further away from the longitudinal axis X towards the first and second emitter optical elements 120, 122. However, the first and second emitter optical elements 120, 122 may be configured to redirect the radiation 198 towards the longitudinal axis X. If an external object 190 is present, the radiation 198 may be reflected towards the receiver optical element 128 and subsequently the receiver 140 that may be located along the longitudinal axis.

As shown in FIG. 1B, the distance d1 between the first emitter optical element 120 and the longitudinal axis X may be substantially similar to the distance d2 between the second emitter optical element 122 and the longitudinal axis X. In other words, the first and second emitter optical elements 120, 122 may be substantially symmetrically spaced apart relative to the longitudinal axis X. However, in another embodiment, the distance d1 may be different from the distance d2.

The body 130 may be configured to enclose the emitter 110, the receiver 140, the first and second emitter optical elements 120, 122, and the receiver optical element 128. As shown in FIG. 1B, the body 130 of the optical device 100 may further comprise first and second emitter apertures 131, 133 allowing radiation from the first and second emitter optical elements 120, 122 to be transmitted through. Similarly, the body 130 may further comprise a receiver aperture 139 allowing reflected radiation 198 from the external object 190 to be transmitted through towards the receiver optical element 128.

Referring to FIG. 1B and FIG. 1C, the receiver optical element 128, the first and second emitter optical elements 120, 122 may be arranged on a horizontal plane 188 located above the receiver 140 and the emitter 110. As shown in FIG. 1C, the horizontal plane 188 may be spaced apart, by a distance d3, vertically from the emitter 110. The receiver optical element 128, the first and second emitter optical elements 120, 122 may be substantially spaced apart along the lateral axis Y, which may be substantially orthogonal to longitudinal axis X and may be substantially orthogonal to a vertical axis Z. In addition, the first and second emitter optical elements 120, 122 may be spaced apart from the longitudinal axis X that may be substantially orthogonal to the vertical axis Z. When the external object 190 is approximating the vertical axis Z, the radiation 198 may be reflected towards the receiver 140 by way of the receiver optical element 128.

FIGS. 2A-2G shows an embodiment of an optical device 200. The optical device 200 may comprise an emitter 210, a receiver 240, first and second emitter optical elements 220, 222 and a receiver optical element 228. The emitter 210 may be configured to emit a radiation to be reflected off of an external object 290 towards the receiver 240 when the external object is present. For illustration purpose, a finger is drawn as the external object 290 but it should be understood that the external object 290 is not limited per the illustration in the drawings. The first and second emitter optical elements 220, 222 may be configured to direct the radiation from the emitter 210 towards the external object 290. The receiver optical element 228 configured to direct a portion of the radiation reflected from the external object 290 towards the receiver 240.

Figure 2A:
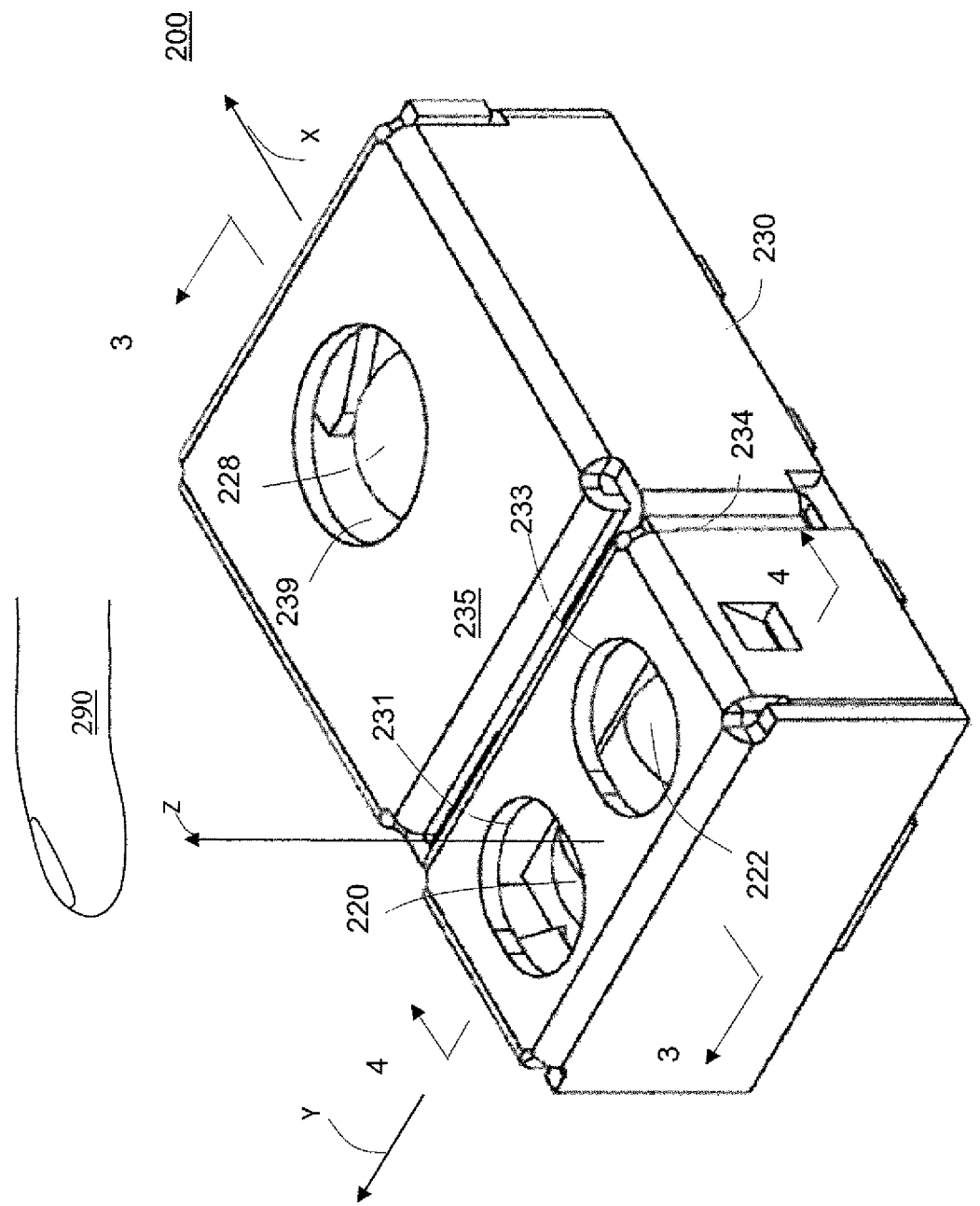
FIG. 2A illustrates a perspective view of an optical device for sensing an external object.

FIG. 2A illustrates a perspective view of the optical device 200. As shown in FIG. 2A, the optical device 200 may further comprise an optional body 230 enclosing the emitter 210, the receiver 240, the receiver optical element 228, the first and second transmitter optical elements 220, 222. The body 230 may comprise a first emitter aperture 231 optically coupled to the first emitter optical element 220, a second emitter aperture 233 optically coupled to the second emitter optical element 222, and a receiver aperture 239 optically coupled to the receiver optical element 228. A portion of the body 230 may comprise a direct reflection shield 235 and an isolating wall 234. The body 230 may extend along a longitudinal axis X. The first and second emitter optical elements 220, 222 may be substantially spaced apart along a lateral axis Y, which may be substantially orthogonal to longitudinal axis X and may be substantially orthogonal to a vertical axis Z.

Figure 2B:
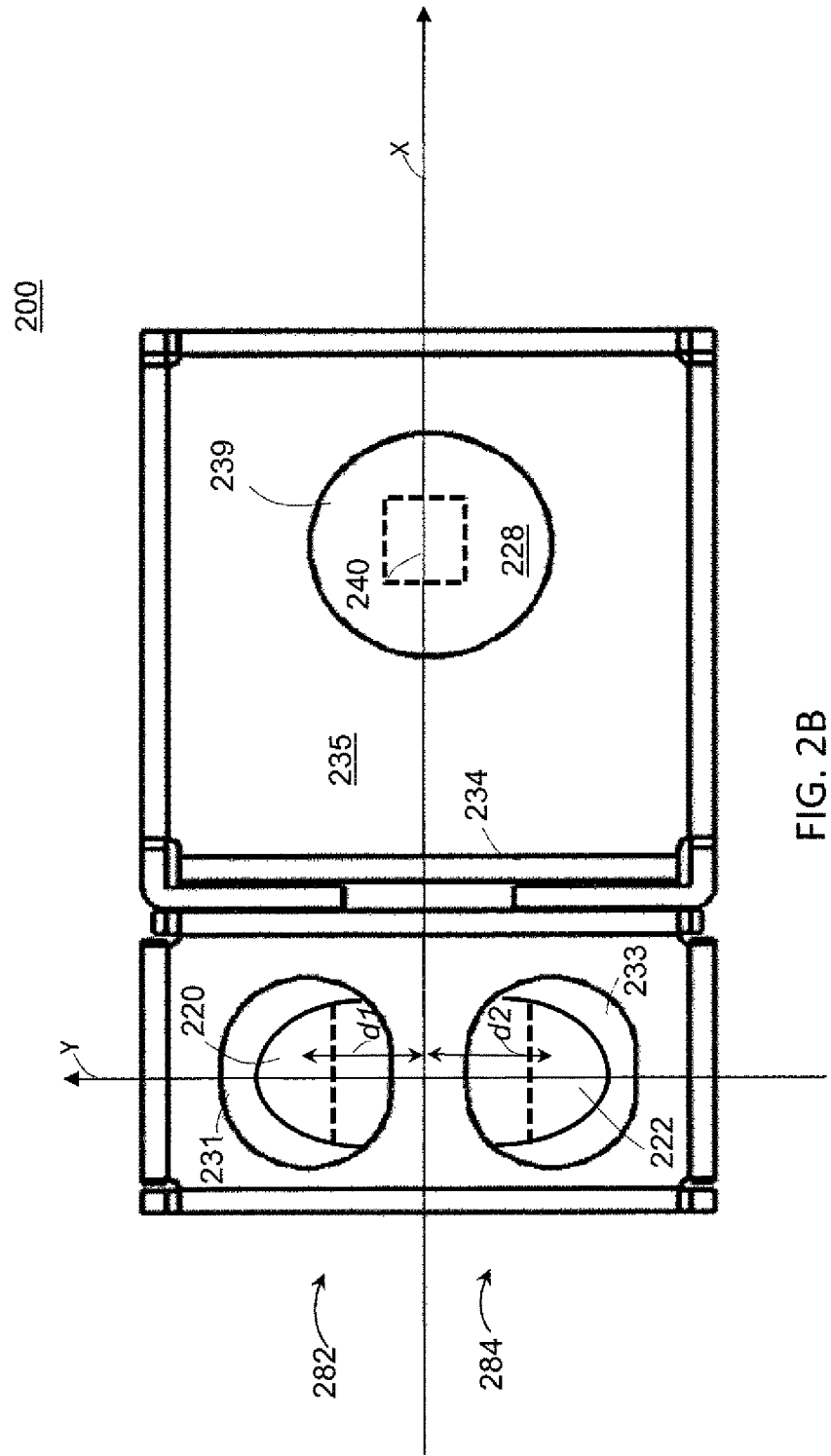
FIG. 2B illustrates a top view of the optical device shown in FIG. 2A.

FIG. 2B illustrates a top view of the optical device 200. The longitudinal axis X may divide the first and second emitter optical elements 220, 222 from one another. As shown in FIG. 2B, the longitudinal axis X may divide the optical device 100 into a first lateral region 282 and a second lateral region 184 from one another. The first emitter optical element 220 may be disposed at the first lateral region 282 of the optical device 200, whereas the second emitter optical element 222 may be disposed at the second lateral region 184.

As shown in FIG. 2B, the emitter 210 and the receiver 240 may be arranged or disposed substantially along the longitudinal axis X. As shown in FIG. 2B, the body 230 may extend longitudinally along the longitudinal axis X. The body 230 may be substantially symmetrically relative to the longitudinal axis X. The longitudinal axis X may be interposed between the first and second emitter optical elements 220, 222 such that the first and second emitter optical elements 220, 222 may be substantially symmetrically spaced apart relative to the longitudinal axis X. In addition, the first and second emitter apertures 231, 233 may be substantially symmetrically spaced apart relative to the longitudinal axis X.

The first and second emitter optical elements 220, 222 may be distanced away from the longitudinal axis X, and may be disposed along a lateral axis Y substantially orthogonal to the longitudinal axis X for directing the radiation from the emitter 210 towards the external object 290. The optical device 200 may be configured to detect the external object 290 that may be present substantially along a vertical plane above the longitudinal axis X. The arrangement of the first and second emitter optical elements 220, 222 being distanced away from the longitudinal axis X may be advantageous for reducing crosstalk.

Figure 2C:
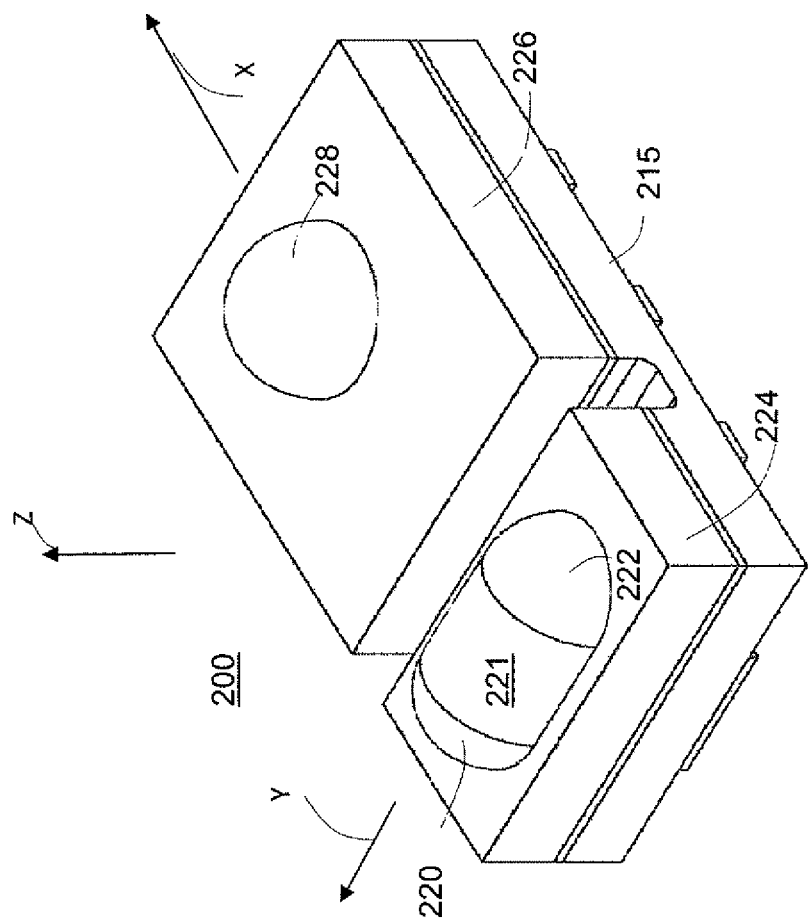
FIG. 2C illustrates a perspective view of the optical device shown in FIG. 2A before the body is formed.
Figure 2D:
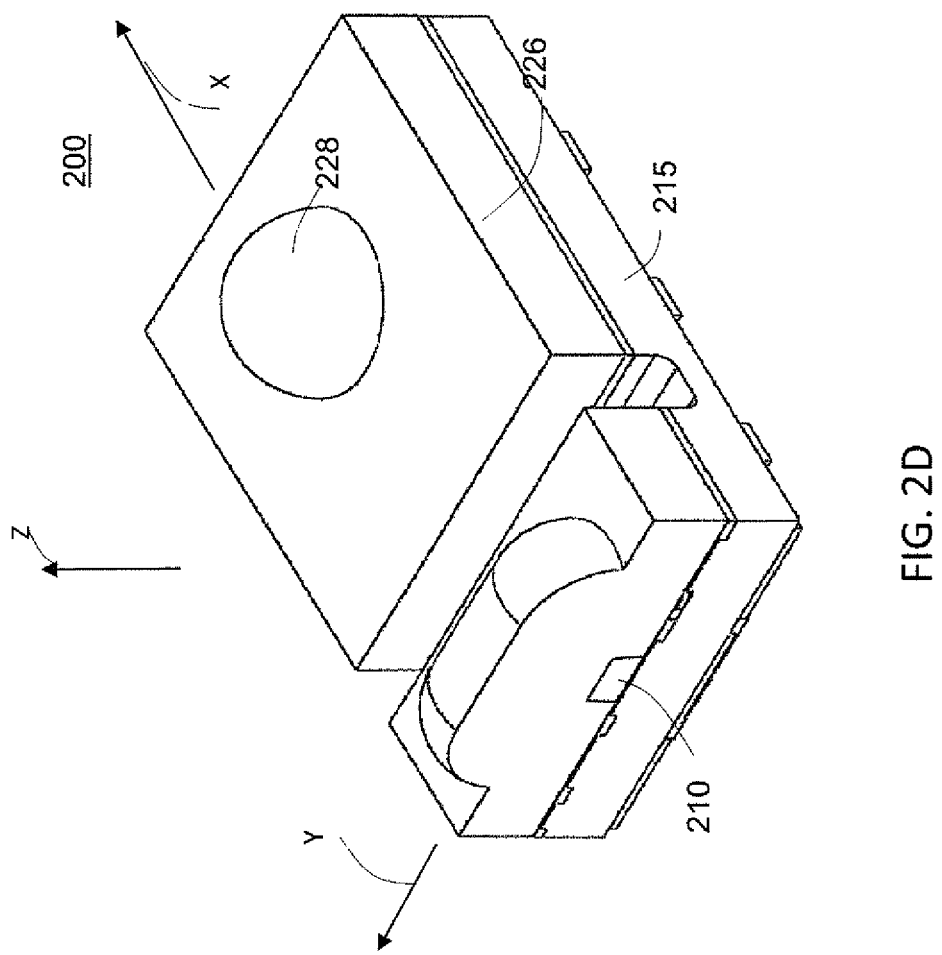
FIG. 2D illustrates a cut-away perspective view of the optical device shown in FIG. 2A before the body is formed showing the emitter.

FIG. 2C illustrates a perspective view of the optical device 200 before the body 230 is formed whereas FIG. 2D illustrates a cut-away perspective view of the optical device 200 showing the emitter 210. Referring to FIGS. 2C and 2D, the emitter 210 and the receiver 240 may be disposed on a substrate 215. The substrate 215 may be a portion of the body 230 made from a molded lead frame structure. Optionally, the substrate 215 may be a printed circuit board (referred hereinafter as "PCB").

The optical device 200 may further comprise a first substantially transparent base encapsulant 224 and a second substantially transparent base encapsulant 226. The first substantially transparent base encapsulant 224 may be encapsulating the emitter 210 whereas the second substantially transparent base encapsulant 226 may be encapsulating the receiver 240. The first and second substantially transparent base encapsulant 224, 226 may be configured to provide a medium for transmitting the radiation and to shield the emitter 210 and the receiver 240 from ambient moisture or dust. The second substantially transparent base encapsulant 226 may be distanced away from the first substantially transparent base encapsulant 224 such that the first and second substantially transparent base encapsulant 224, 226 may be substantially optically isolated.

As shown in FIG. 2C and FIG. 2D, the first substantially transparent base encapsulant 224 may comprise the first and second emitter optical elements 220, 222 arranged on the first substantially transparent base encapsulant 224. The first and second emitter optical elements 220, 222 may be formed on a top surface of the first substantially transparent base encapsulant 224 to direct radiation towards the external object 290. Similarly, the second substantially transparent base encapsulant 226 may comprise the receiver optical element 228 arranged on the second substantially transparent base encapsulant 226. The second substantially transparent base encapsulant 226 may be formed on a top surface of the second substantially transparent base encapsulant 226 to direct radiation reflected from the external object 290.

In the embodiment shown in FIG. 2C, each of the first and second emitter optical elements 220, 222 may be a lens section as shown in FIG. 2C and may not be an entire spherical lens. The first and second emitter optical elements 220, 222 may be spaced apart. As shown in FIG. 2C, a spacing 221 may be interposed between the first and second emitter optical elements 220, 222. A transmission guide 221 may be arranged entirely or partially between the first and second emitter optical elements 220, 222 filling up the spacing 221. Optically coupling the first and second emitter optical elements 220, 222 may be advantageous by way of increasing optical power efficiency. The radiation reflected through total internal reflection by one of the first and second emitter optical elements 220, 222 may be recycled and may be redirected towards the other one of the first and second emitter optical elements 220, 222.

Figure 2E:
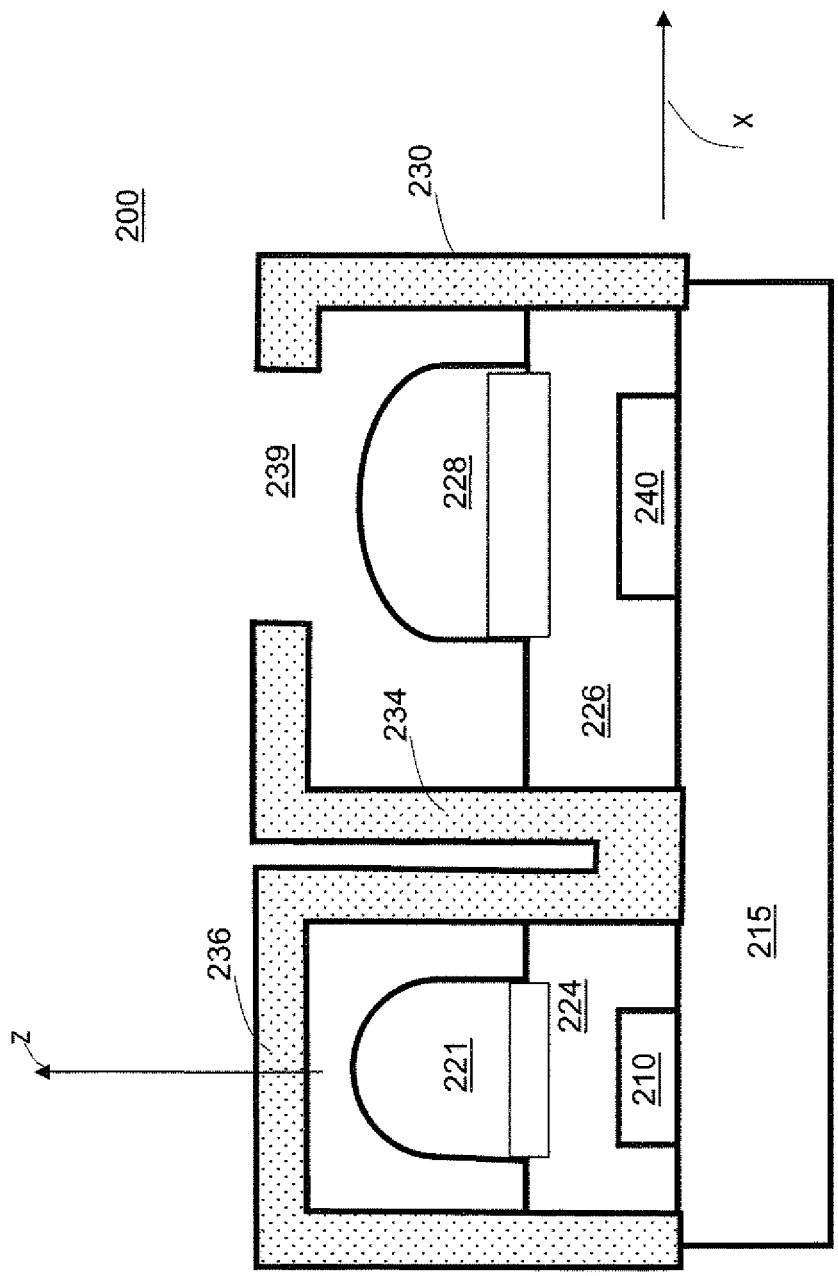
FIG. 2E illustrates a cross-sectional view of the optical device along line 3-3 shown in FIG. 2A.

FIG. 2E illustrates a cross-sectional view of the optical device 200 along cross sectional line 3-3 shown in FIG. 2A. The cross sectional line 3-3 may be taken along the longitudinal axis X, and/or the vertical plane extending along vertical axis Z shown in FIG. 2B. As shown in FIG. 2E, on the vertical plane likewise extending along the longitudinal axis X, the radiation from the emitter 210 may be blocked by the isolating wall 234 and a direct radiation block portion 236 of the body 230. As shown in FIG. 2F illustrating a cross-sectional view of the optical device 200 along line 4-4 shown in FIG. 2A, the first and second emitter apertures 231, 233 may be located substantially away from the vertical axis Z and the vertical plane Z. The radiation from the emitter 210 may be transmitted to the first and second emitter optical elements 220, 222 first through the transmission guide 221 or the first substantially transparent base encapsulant 224 before the radiation is directed towards the external object 290 through the first and second emitter apertures 231, 233 of the optical device 200.

In contrast to the emitter 210, the receiver aperture 239 may be arranged on the receiver optical element 228 and the receiver 240 on the vertical plane extending along the vertical axis Z as shown in FIG. 2E. The second substantially transparent base encapsulant 226 may be a transmission guide for directing radiation entering the receiver aperture 239 toward the receiver 240.

Figure 2H:
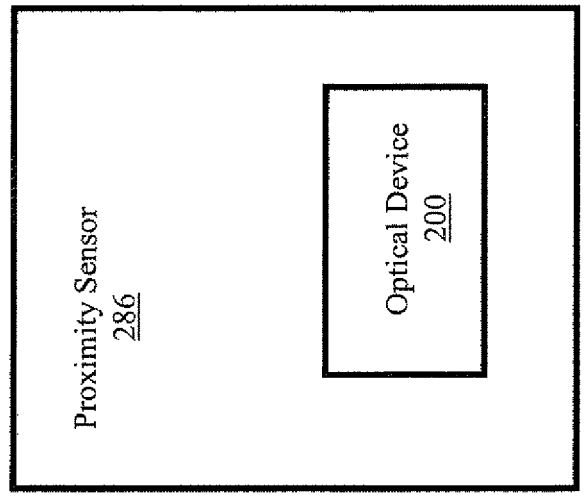
FIG. 2H illustrates a block diagram of a proximity sensor having the optical device shown in FIG. 2A.
Figure 2G:
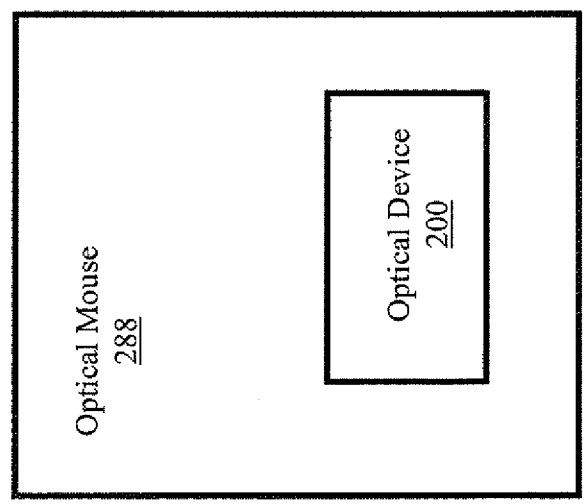
FIG. 2G illustrates a block diagram of an optical mouse having the optical device shown in FIG. 2A.

The optical device 200 having such arrangement illustrated above may be advantageous for reducing crosstalk. With such advantages, the optical device 200 may be used in applications such as optical mouse, proximity sensors, color sensors, reflective optical encoders and other sensors involving reflective arrangement. A block diagram of an optical mouse 288 having the optical device 200 is illustrated in FIG. 2G whereas a block diagram of a proximity sensor 286 having the optical device 200 is shown in FIG. 2H.

FIGS. 3A-3E shows an embodiment of a proximity sensor 300. The proximity sensor may comprise a substrate 315, first and second emitters 310, 312, a second emitter 312, a receiver 340, first and second emitter optical elements 320, 322 and a receiver optical element 328. The substrate 315 may extend longitudinally along a longitudinal axis X. The first and second emitters 310, 312 and the receiver 340 may be disposed on the substrate 315. The substrate 315 may be a PCB or a lead-frame molded body. The substrate 315 may be arranged symmetrically relative to the longitudinal axis X. Each of the first and second emitters 310, 312 may be configured to emit a radiation to be reflected off of an external object 390 towards the receiver 340 when the external object 390 is present. The first and second emitter optical elements 320, 322 may be optically coupled to the first and second emitters 310, 312 respectively. The first and second emitter optical elements 320, 322 may be configured to direct the radiation from the first and second emitters 310, 312 towards the external object 390.

FIG. 3A illustrates a top view of the proximity sensor 300. The receiver optical element 328 and the receiver 340 may be arranged or disposed substantially along the longitudinal axis X. More specifically, the receiver 340 may be disposed along the longitudinal axis X. The receiver optical element 328 may be optically coupled to the receiver 340. The receiver optical element 328 may be configured to direct a portion of the radiation reflected from the external object 390 towards the receiver 340. The longitudinal axis X may be interposed between the first and second emitter optical elements 320, 322 as well as the first and second emitters 310, 312.

As shown in FIG. 3A, the longitudinal axis X may divide the first and second emitter optical elements 320, 322 from one another. Similarly, the longitudinal axis X may also divide the first and second emitters 310, 312 from one another. As shown in FIG. 3A, the longitudinal axis X may divide the proximity sensor 300 into a first lateral region 382 and a second lateral region 384 from one another. The first emitter optical element 320 and the first emitter 310 may be disposed at the first lateral region 382 of the optical device 100, whereas the second emitter optical element 322 and the second emitter 312 may be disposed at the second lateral region 384.

In addition, the first and second emitters 310, 312 may be arranged along a lateral axis Y substantially orthogonal to the longitudinal axis X. The first and second emitter optical elements 320, 322 may be arranged above the first and second emitters 310, 312. The first and second emitter optical elements 320, 322 may be disposed along the lateral axis Y substantially orthogonal to the longitudinal axis X.

Figure 3B:
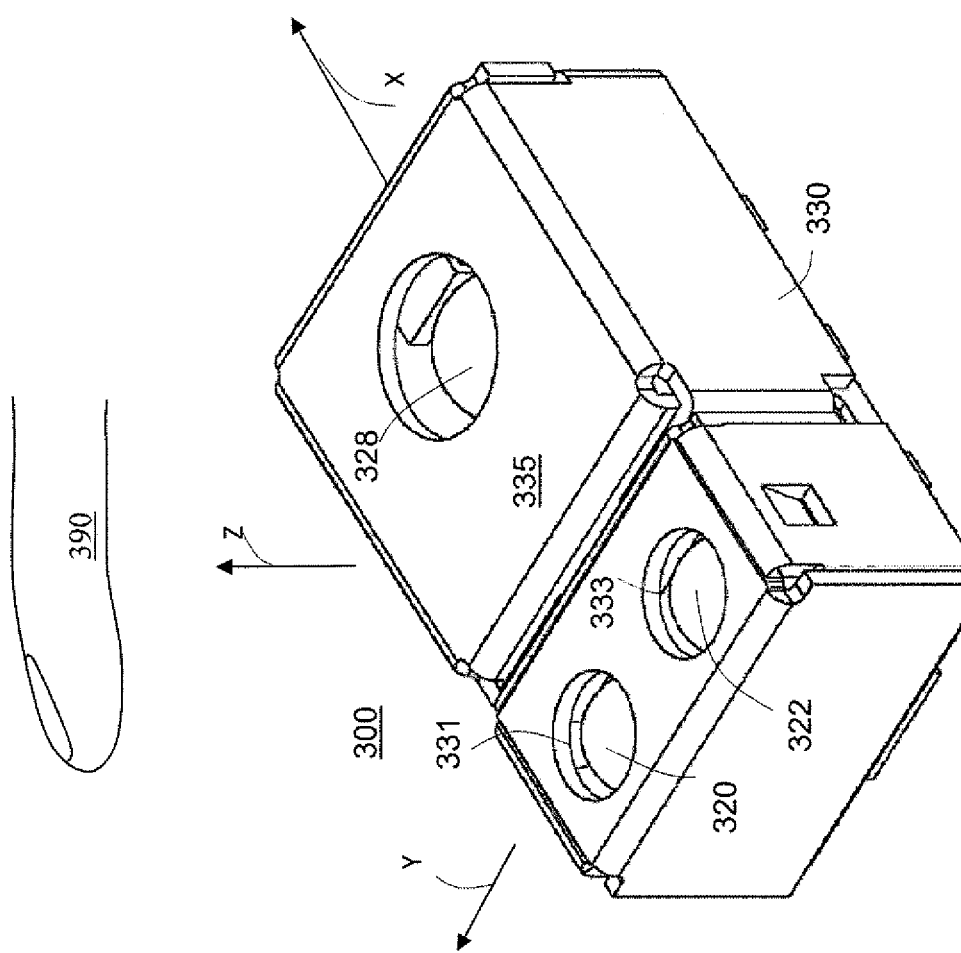
FIG. 3B illustrates a perspective view of the proximity sensor shown in FIG. 3A.

FIG. 3B illustrates a perspective view of the proximity sensor 300. The proximity sensor 300 may further comprise a body 330 having first and second emitter apertures 331, 333 and a receiver aperture 339. The first and second emitter apertures 331, 333 may be optically coupled to the first and second emitter optical elements 320, 322 respectively. The receiver aperture 339 may be optically coupled to the receiver optical element 328. In addition to the first and second emitters 310, 312, the first and second emitter apertures 331, 333 as well as the first and second emitter optical elements 320, 322 may be arranged interposing the longitudinal axis X and may be substantially symmetrically spaced apart relative to the longitudinal axis X.

Figure 3C:
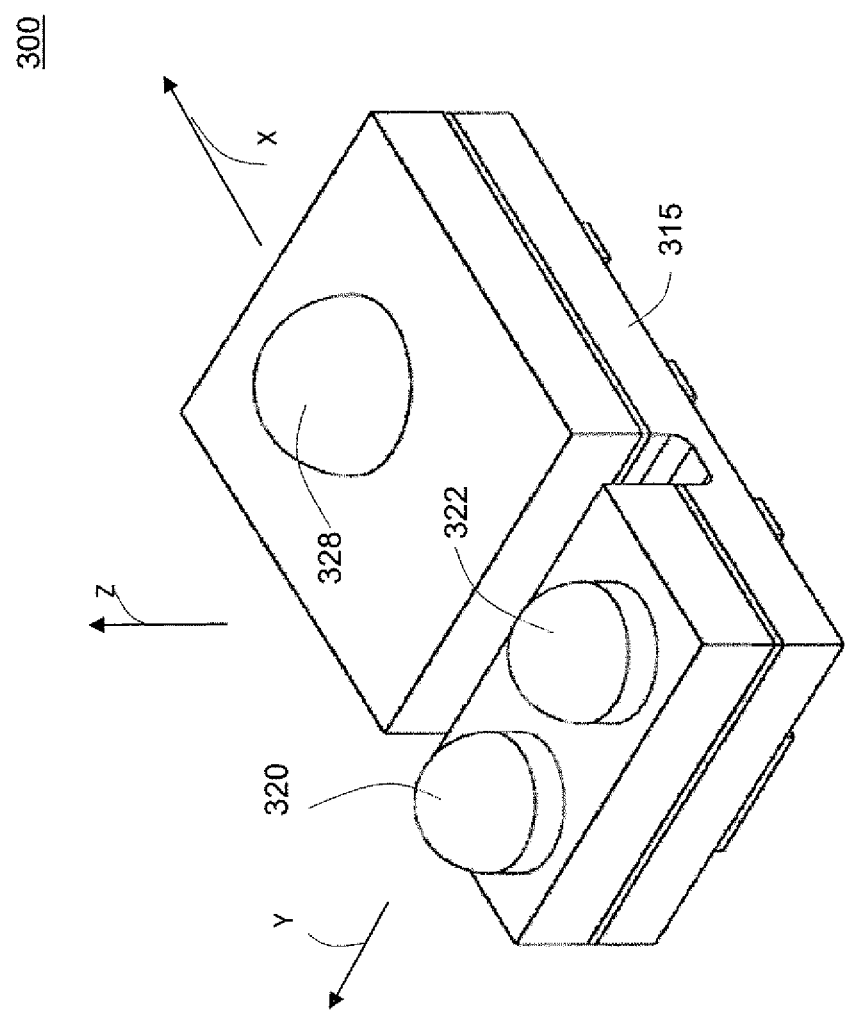
FIG. 3C illustrates a perspective view of the proximity sensor shown in FIG. 3A before the body is formed.
Figure 3D:
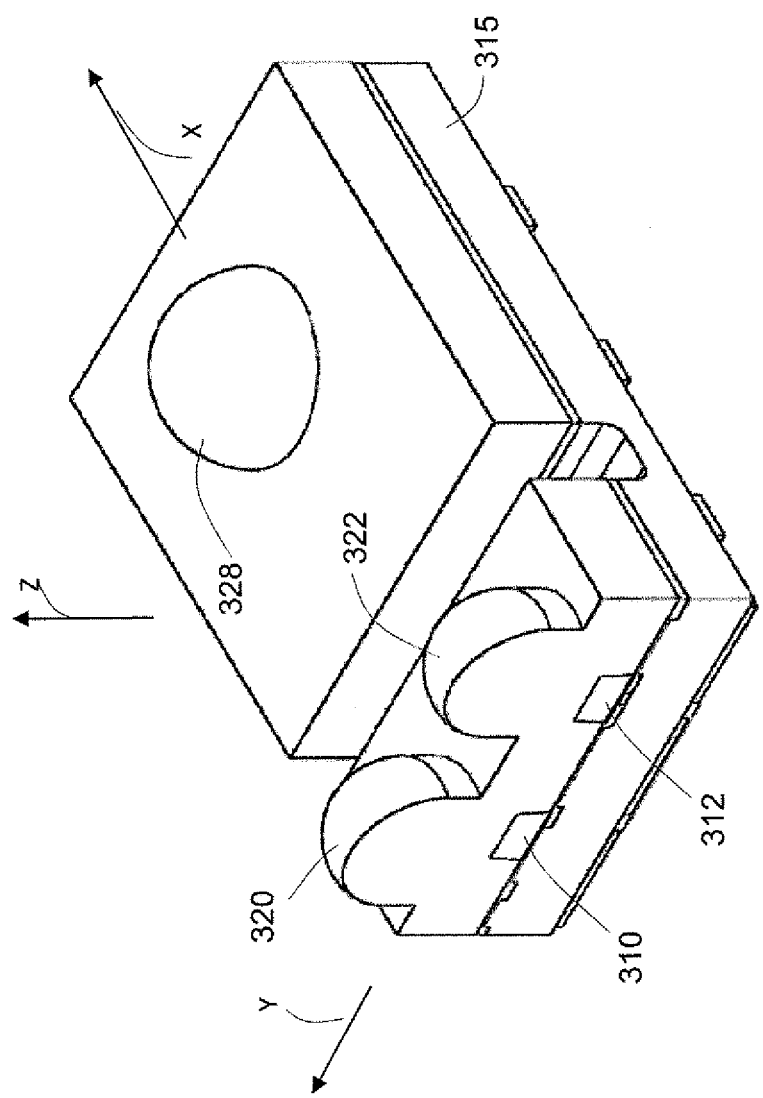
FIG. 3D illustrates a cut-away perspective view of the proximity sensor shown in FIG. 3A before the body is formed showing the emitters.

FIG. 3C illustrates a perspective view of the proximity sensor 300 before the body 330 is formed whereas FIG. 3D illustrates a cut-away perspective view of the proximity sensor 300 before the body 330 is formed showing the first and second emitters 310, 312. The first and second optical elements 320, 322 may comprise a spherical lens formed or arranged on a substantially transparent base encapsulant 324 encapsulating the first and second emitters 310, 312. The first and second optical elements 320, 322 may be spaced apart from each other. As shown in FIG. 3C, the first and second optical elements 320, 322 may be optically coupled to the substantially transparent base encapsulant 324.

As shown in FIG. 3D, the first and second emitters 310, 312 may be disposed on the substrate 315. As the first and second optical elements 320, 322 are arranged directly above the first and second emitters 310, 312 respectively, radiation from the first and second emitters 310, 312 may be transmitted substantially to each of the first and second optical elements 320, 322. In other words, a substantial amount of the radiation emitter by the first emitter 310 may be transmitted to the first optical element 320 and a relatively small portion of the radiation emitted from the first emitter 310 may enter the second optical element 322.

Figure 3E:
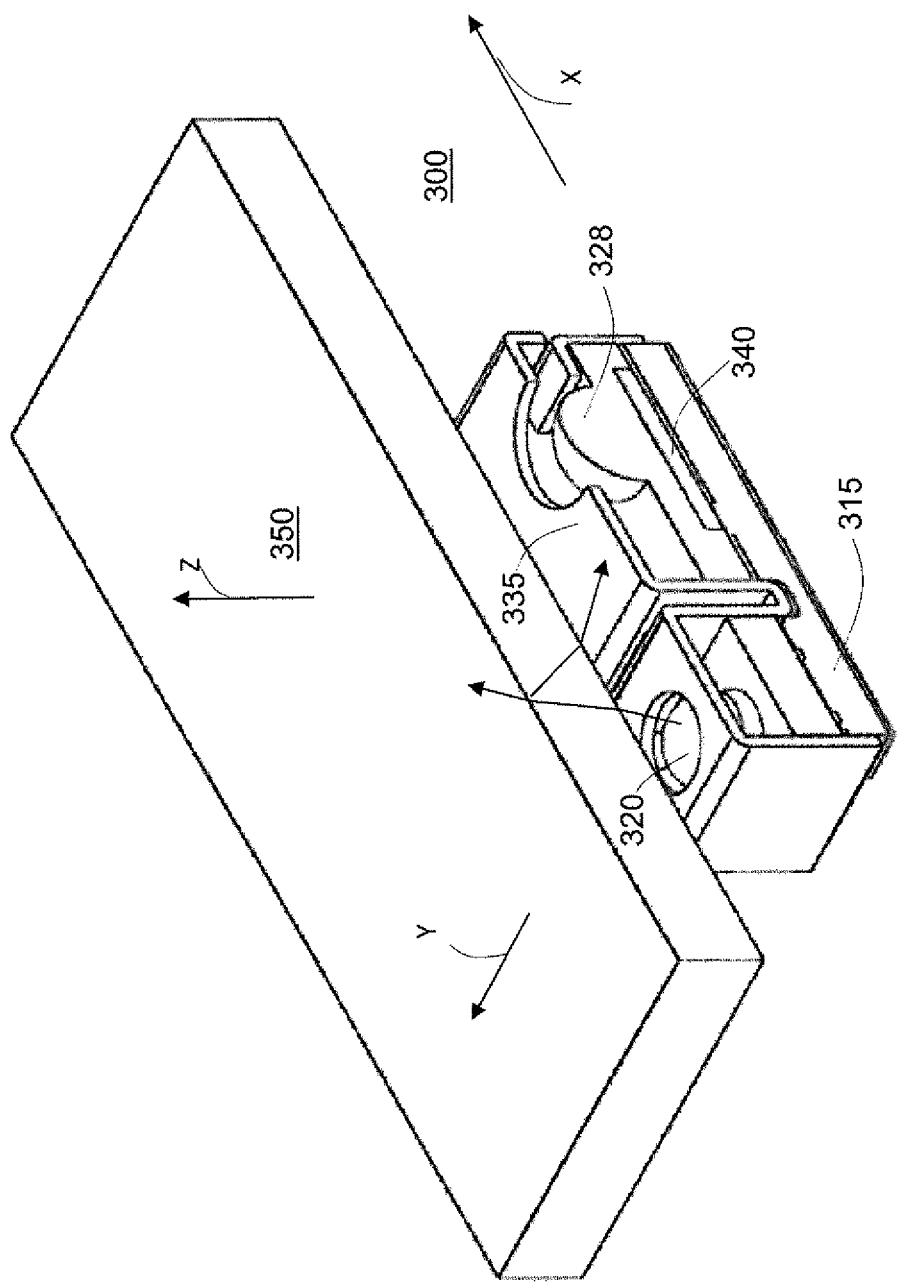
FIG. 3E illustrates a perspective view of the proximity sensor shown in FIG. 3A illustrating how an external casing cause crosstalk.

FIG. 3E illustrates a perspective view of the proximity sensor 300 being placed approximating an external cover 350. The proximity sensor 300 may form a portion of an optical apparatus (not shown) having the external cover 350. As shown in FIG. 3E, total internal reflection may occur and the radiation emitted from either or both of the first and second emitters 310, 312 may be redirected back towards the proximity sensor 300. As shown in FIG. 3E, the proximity sensor 300 may further comprise a direct reflection shield 335 configured to shield the radiation reflected by way of total internal reflection caused by the external cover 350. In addition, the receiver 340 may be arranged such that the radiation reflected by way of total internal reflection may fall outside the receiver 340.

Figure 4B:
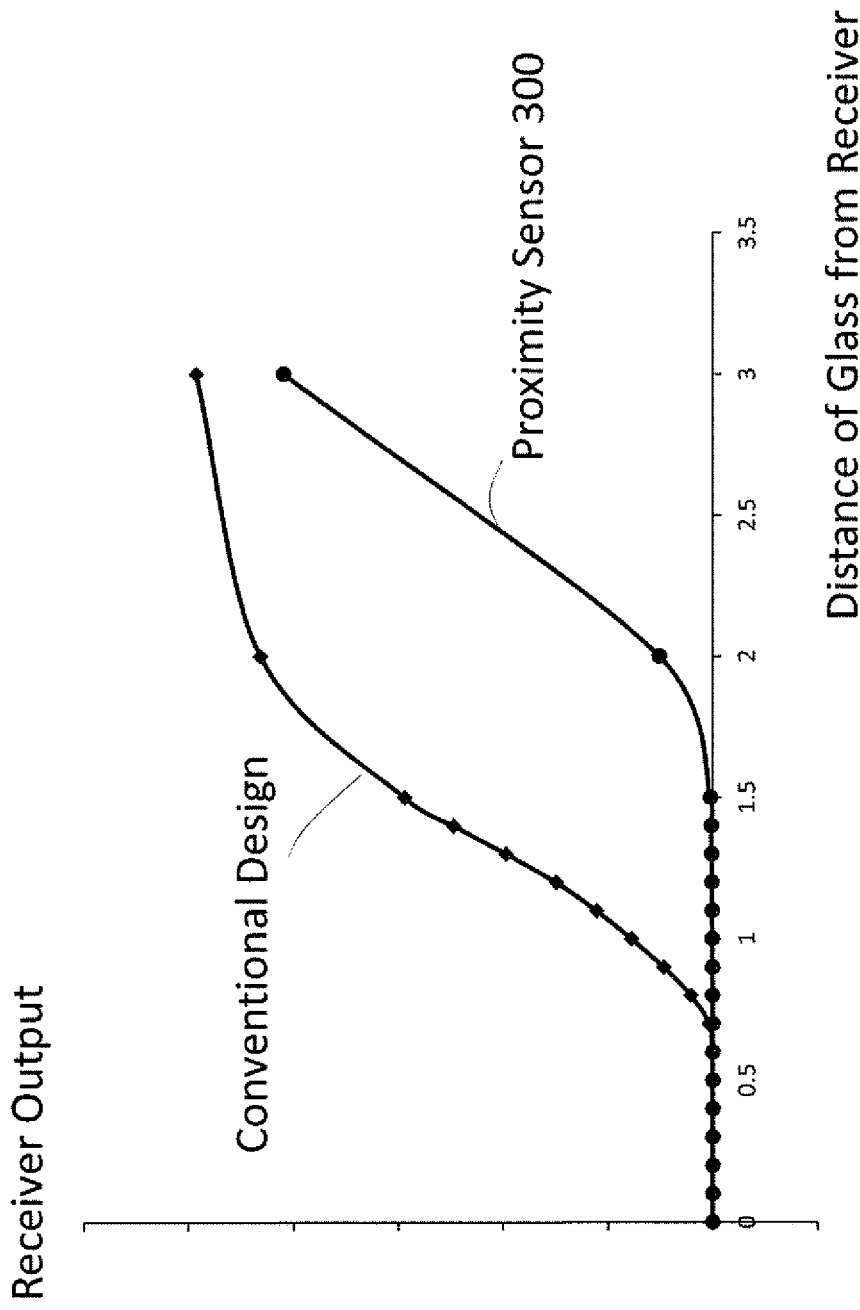
FIG. 4B illustrates a graph showing receiver output plotted against distance of an external casing when the external casing is moved away from the receiver.

Performance of the proximity sensor 300 compared to conventional proximity sensor (not shown) having a single emitter optical element is illustrated in FIG. 4A and FIG. 4B. FIG. 4A illustrates a graph showing a receiver output plotted against distance of an external object 390 when the external object 390 is moved away from the receiver 340. The vertical axis of the graph indicates the receiver output whereas the horizontal axis of the graph indicates the distance of an external object 390 from the receiver 340. As shown in FIG. 4A, the performance of the proximity sensor 300 may be substantially similar or comparable compared to the conventional proximity sensor (not shown).

FIG. 4B illustrates a graph showing receiver output plotted against distance of an external cover when the external cover is moved away from the receiver 340. The vertical axis of the graph indicates the receiver output whereas the horizontal axis of the graph indicates the distance of an external cover from the receiver 340. As shown in FIG. 4B, at a distance of less than 2 mm, the detector output of the proximity sensor 300 is approximately zero, indicating no crosstalk signal. However, the detector output of a conventional proximity sensor may produce substantial output indicating crosstalk at such distance. The results shown in the graph in FIG. 4A and FIG. 4B may demonstrate some of the advantages of the proximity sensor 300 that reduce crosstalk.

Figure 5:
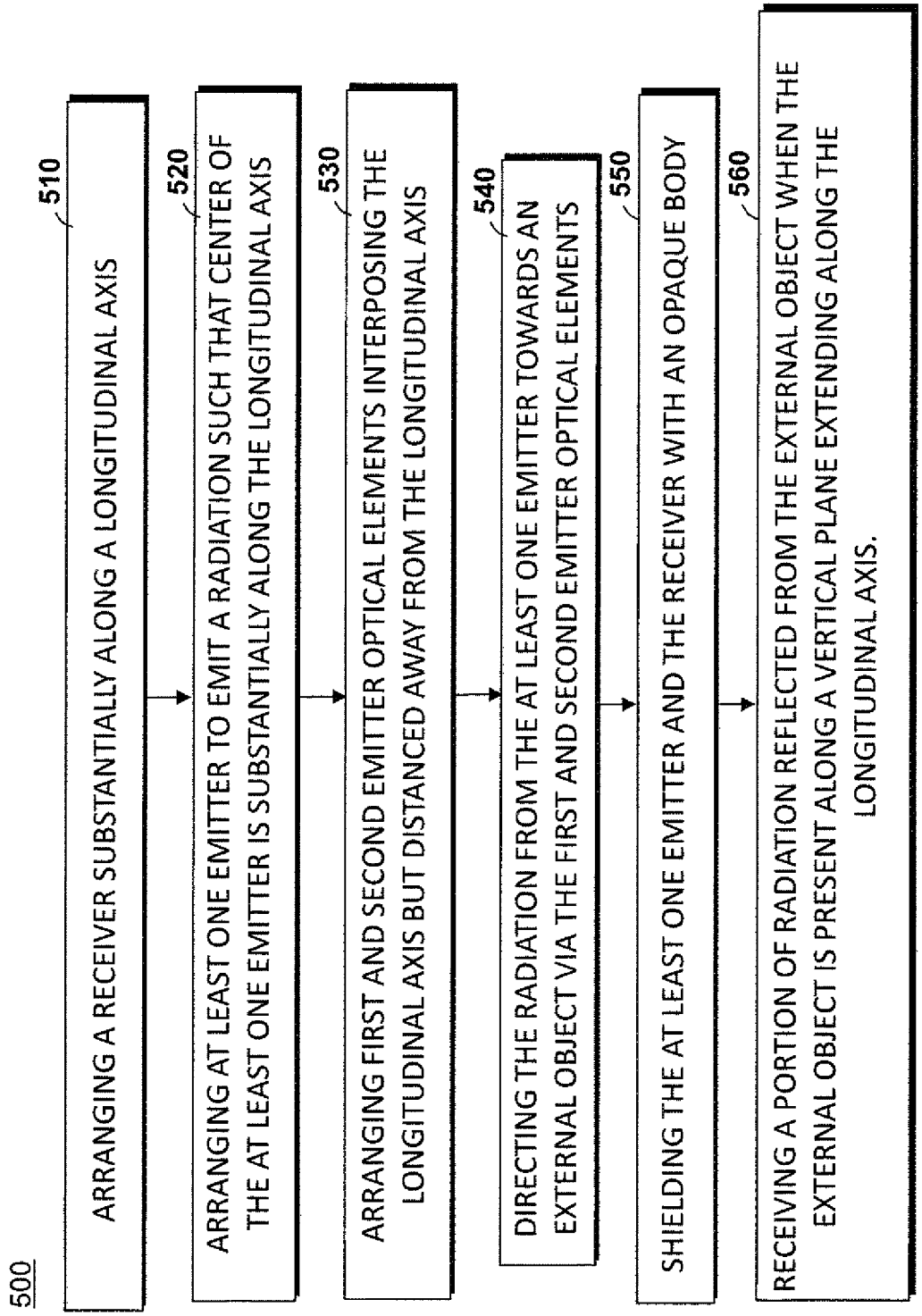
FIG. 5 illustrates a flow chart showing a method for reducing crosstalk by way of total internal reflection.

FIG. 5 illustrates a flow chart showing a method for reducing crosstalk by way of total internal reflection of an optical device. The crosstalk may be from a substantially transparent cover located adjacent to or approximating the optical device. In step 510, a receiver may be arranged substantially along a longitudinal axis. In the subsequent step 520, at least one emitter may be arranged adjacent to the receiver such that center of the at least one emitter is substantially along the longitudinal axis. The at least one emitter may be configured to emit a radiation towards an external object.

In step 530, first and second emitter optical elements may be arranged interposing the longitudinal axis but distanced away from the longitudinal axis. With this arrangement, the at least one emitter and the receiver may be arranged along the longitudinal axis, and/or along a vertical plane extending along the longitudinal axis. When the external object is present along the vertical plane, a portion of the radiation may be reflected thereof to the receiver.

Next in step 540, the radiation from the at least one emitter may be directed towards an external object via the first and second emitter optical elements. By having the first and second emitter optical elements arranged distanced away from the longitudinal axis and the vertical plane, the radiation may not travel substantially in parallel to the vertical plane. In step 550, the at least one emitter and the receiver may be shielded with an opaque body such that direct radiation, or radiation reflected back from the external cover by way of total internal reflection may be substantially attenuated or reduced.

In step 550, a portion of radiation reflected from the external object may be received when the external object is present along a vertical plane extending along the longitudinal axis.

Different aspects, embodiments or implementations may, either individually and/or in combination, but need not, yield one or more of the following advantages. For example, the arrangement of one or more than one of the emitters, the emitter optical elements, the receiver optical element and the receiver may be advantageous for reducing crosstalk that may be caused by total internal reflection from an external cover. Although different aspects have been presented in each embodiment, all or part of the different aspects illustrated in each embodiment may be combined. For example, the optical devices shown in FIGS. 1A-1C and FIGS. 2A-2H may have double emitters as shown in FIGS. 3A-3E.

Various embodiments of the invention are contemplated in addition to those disclosed hereinabove. Although specific embodiments of the invention have been described and illustrated, the invention is not to be limited to the specific forms or arrangements of parts so described and illustrated. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention. It is to be understood that the illustration and description shall not be interpreted narrowly.

What is claimed is:

1. An optical device for sensing an external object, comprising:
    an emitter, the emitter configured to emit a radiation to be reflected off of the external object;
    first and second emitter optical elements configured to direct the radiation from the emitter towards the external object;
    a receiver;
    a receiver optical element for directing a portion of the radiation reflected thereof from the external object to the receiver;
    a transmission guide; and
    a spacing interposed between the first and second emitter optical elements, wherein at least a portion of the transmission guide is arranged adjacent to the spacing;
    wherein the emitter and the receiver are arranged substantially along a longitudinal axis, and the longitudinal axis is interposed between the first and second emitter optical elements, dividing the first and second emitter optical elements from one another.

2. The optical device of claim 1 further comprising an isolating wall for shielding the receiver from receiving the radiation directly from the emitter.

3. The optical device of claim 1, wherein the emitter is configured to emit the radiation in direction further away from the longitudinal axis, and wherein the first and second emitter optical elements are configured to redirect the radiation towards the longitudinal axis.

4. The optical device of claim 1 wherein the first and second emitter optical elements are substantially symmetrically spaced apart relative to the longitudinal axis.

5. The optical device of claim 1, wherein the receiver optical element, the first and second emitter optical elements are substantially spaced apart around a vertical axis, and wherein the receiver, the first and second emitter optical elements are configured to detect the external object when the external object is approximating the vertical axis.

6. The optical device of claim 1, wherein the optical device forms a portion of an optical apparatus having a substantially transparent cover, and the optical device comprises a direct reflection shield to block the radiation reflected from the substantially transparent cover by way of total internal reflection.

7. The optical device of claim 6, wherein the substantially transparent cover, the emitter, the receiver, the first and second emitter optical elements are arranged such that the radiation reflected by the substantially transparent cover falls outside of the receiver optical element.

8. An optical device for sensing an external object, comprising:
    an emitter for emitting a radiation to be reflected off of the external object;
    a receiver for detecting radiation, wherein the emitter and the receiver are disposed substantially along a longitudinal axis;
    first and second emitter optical elements disposed along a lateral axis substantially orthogonal to the longitudinal axis for directing the radiation from the emitter towards the external object;
    a receiver optical element configured to direct a portion of the radiation reflected from the external object towards the receiver;
    a body;
    first and second emitter apertures optically coupled to the first and second emitter optical elements; and
    a receiver aperture optically coupled to the receiver optical element.

9. The optical device of claim 8, wherein the first and second emitter apertures are substantially symmetrically spaced apart relative to the longitudinal axis.

10. The optical device of claim 8, wherein the longitudinal axis is interposed between the first and second emitter optical elements.

11. The optical device of claim 8, wherein the first and second emitter optical elements are substantially symmetrically spaced apart relative to the longitudinal axis.

12. The optical device of claim 8 further comprising a transmission guide, and a spacing interposed between the first and second emitter optical elements, wherein at least a portion of the transmission guide is arranged adjacent to the spacing.

13. The optical device of claim 12, wherein the first and second emitter optical elements are optically coupled together through the transmission guide.

14. The optical device of claim 8 further comprising a first substantially transparent base encapsulant encapsulating the emitter, wherein the first and second emitter optical elements are arranged on the first substantially transparent base encapsulant.

15. The optical device of claim 8 further comprising a second substantially transparent base encapsulant encapsulating the receiver, wherein the receiver optical element is arranged on the second substantially transparent base encapsulant.

16. The optical device of claim 8 further comprising a first substantially transparent base encapsulant encapsulating the emitter, and a second substantially transparent base encapsulant encapsulating the receiver distanced away from the first substantially transparent base encapsulant.

17. A proximity sensor, comprising:
a substrate extends along a longitudinal axis;
first and second emitters disposed on the substrate, each of the first and second emitters configured to emit a radiation;
first and second emitter optical elements optically coupled to the first and second emitters respectively interposing the longitudinal axis;
a receiver disposed on the substrate along the longitudinal axis; and
a receiver optical element optically coupled to the receiver;
a transmission guide; and
a spacing interposed between the first and second emitter optical elements, wherein at least a portion of the transmission guide is arranged adjacent to the spacing.

18. The proximity sensor of claim 17, wherein first and second emitters are arranged substantially symmetrically spaced apart relative to the longitudinal axis.

19. The proximity sensor of claim 17, wherein first and second emitters are arranged along an axis substantially orthogonal to the longitudinal axis.

20. The optical device of claim 8 further comprising an isolating wall for shielding the receiver from receiving the radiation directly from the emitter.

* * * * *